United States Patent
Tojo et al.

(10) Patent No.: US 8,081,554 B2
(45) Date of Patent: Dec. 20, 2011

(54) OPTICAL PICKUP DEVICE WITH SPECIFIC WAVELENGTH LIGHT BLOCKING MEMBERS FOR PREVENTING FURTHER CURING OF ADHESIVE

(75) Inventors: Tomoaki Tojo, Hyogo (JP); Masatoshi Yajima, Osaka (JP); Yasushi Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/858,103

(22) Filed: Aug. 17, 2010

(65) Prior Publication Data

US 2011/0044150 A1 Feb. 24, 2011

(30) Foreign Application Priority Data

Aug. 19, 2009 (JP) ................................. 2009-189763

(51) Int. Cl.
*G11B 7/16* (2006.01)
(52) U.S. Cl. ................................. 369/112.22
(58) Field of Classification Search .................. 359/361; 369/112.22
See application file for complete search history.

(56) References Cited

U.S. PATENT DOCUMENTS

| | | | | |
|---|---|---|---|---|
| 6,097,536 A | * | 8/2000 | Bauer et al. | 359/350 |
| 7,081,278 B2 | * | 7/2006 | Lipson et al. | 427/553 |
| 7,672,067 B2 | | 3/2010 | Kawanami | |
| 2004/0264342 A1 | * | 12/2004 | Hirayama | 369/112.01 |
| 2009/0002674 A1 | * | 1/2009 | Kawanami | 355/71 |
| 2009/0081360 A1 | * | 3/2009 | Fedorovskaya et al. | 427/160 |

FOREIGN PATENT DOCUMENTS

| | | | |
|---|---|---|---|
| JP | 3-271707 | | 12/1991 |
| JP | 7-249234 | | 9/1995 |
| JP | 11014876 A | * | 1/1999 |
| JP | 11-68126 | | 3/1999 |
| JP | 2007-240583 | | 9/2007 |
| JP | 2008-305516 | | 12/2008 |
| JP | 2009-10232 | | 1/2009 |
| JP | 2009-206524 | | 9/2009 |

* cited by examiner

*Primary Examiner* — Will J Klimowicz
*Assistant Examiner* — Mark Fischer
(74) *Attorney, Agent, or Firm* — Hamre, Schumann, Mueller & Larson, P.C.

(57) ABSTRACT

An optical pickup device includes: a light source for emitting light in a first wavelength range; an optical element for transmitting the light; a supporting member for supporting the optical element through an adhesive; a first light blocking member for blocking the light emitted from the light source from entering the adhesive when the optical element guides the emitted light to the optical disc; and a second light blocking member for blocking the light reflected from the optical disc from entering the adhesive when the optical element guides the reflected light to the detector unit. In this optical pickup device, at least one of the first and second light blocking member blocks the light in the first wavelength range and transmits light in a second wavelength range.

7 Claims, 7 Drawing Sheets

//OPTICAL PICKUP DEVICE WITH SPECIFIC WAVELENGTH LIGHT BLOCKING MEMBERS FOR PREVENTING FURTHER CURING OF ADHESIVE

BACKGROUND OF THE INVENTION

1. Field of the Invention

The present invention relates to an optical pickup device including a light source, an optical element, and a supporting member for supporting the optical element through an adhesive, and particularly to an optical pickup device using a blue-violet laser as the light source.

2. Description of Related Art

Recently, there have been developed and manufactured optical pickup devices for recording or reproducing information on or from various optical discs such as CDs (Compact Discs), DVDs (Digital Versatile Discs), and BDs (Blu-ray Discs).

For example, as shown in JP 2008-305516 A, such an optical pickup device includes a light source (for example, a semiconductor laser), a detector unit (for example, a semiconductor light receiving element), and optical elements (for example, a diffractive lens, a collimating lens, and a relay lens) through which light emitted from the light source and light reflected from an optical disc and guided to the detector unit pass.

The optical elements are fixed, with an adhesive, to the device body and its components such as a lens holder of an objective lens driving device. The adhesive is a resin that can be cured by ultraviolet light (UV-curable resin).

Conventionally, glass has been used as a material for optical elements. Recently, however, in response to a demand for cost reduction in optical pickup devices, plastic has been used as a material not only for a diffractive lens having a diffraction grating formed on its surface but also for optical elements such as a collimating lens and an objective lens.

With an increase in the capacity of optical discs, short-wavelength lasers have been used as light sources. For example, an infrared laser with a center wavelength of 780 nm is used as a light source for CDs. A red laser with a center wavelength of 650 nm is used as a light source for DVDs. A blue-violet laser with a center wavelength of 405 nm is used as a light source for BDs.

In response to a demand for size reduction of the device body and its components such as a lens holder, a UV-curable adhesive can be applied to a limited area, and thus is used in the vicinity of the optical element or on the edge portion thereof. The optical element transmits outgoing light emitted from the light source and guided to the optical disc, and returning light reflected from the optical disc and guided to the detector unit. When the optical element transmits these lights, the adhesive used in the vicinity of the optical element or the edge portion thereof may be irradiated with part of the lights. The adhesive also may be irradiated with unnecessary stray light components that have not been guided to the detector unit.

Figure 6:
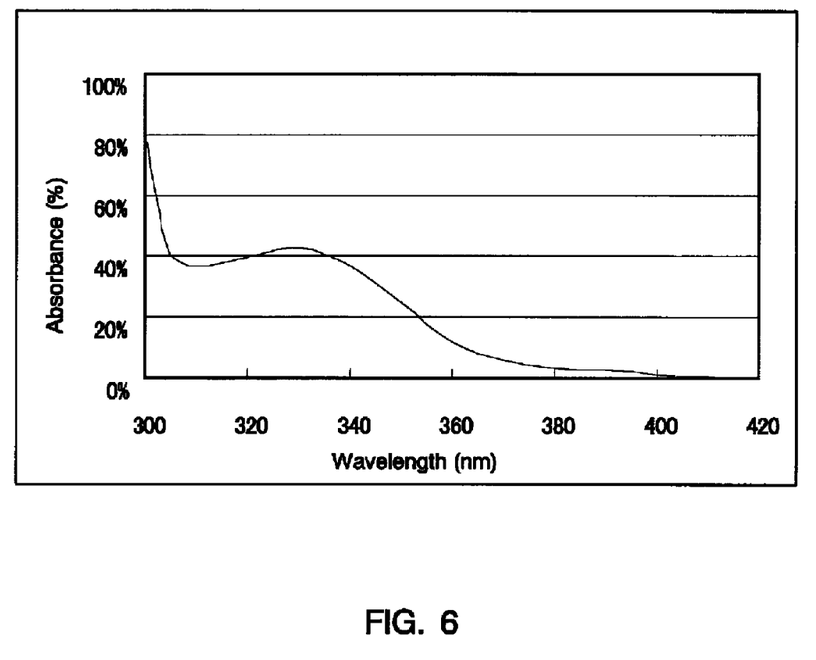
FIG. 6 is a graph showing an example of the absorption spectrum of a UV curable adhesive.

Typically, a UV-curable adhesive has an absorption spectrum shown in FIG. 6, in which a slight absorption is observed in the wavelength range of blue-violet laser light. The UV-curable adhesive is cured when it is exposed to ultraviolet irradiation to fix the optical element. In this case, part of a photopolymerization initiator remains unreacted. Therefore, if a blue-violet laser is used as a light source, when the adhesive is exposed to the light from the light source, the remaining unreacted photopolymerization initiator in the adhesive causes a further curing reaction. Accordingly, in an optical pickup device using a blue-violet laser as a light source, as the use of the optical device increases, that is, as the continuous blue-violet laser irradiation time increases, the curing of the adhesive proceeds further and further.

As the adhesive is cured further in this way, its qualities are changed (for example, it shrinks or becomes deformed). The cure shrinkage and deformation of the adhesive generate stresses, which change the position, posture, shape, etc. of the optical element. If the optical element is made of plastic, since the plastic optical element has a lower modulus of elasticity than a glass optical element, the change in the shape (aberration) of the plastic optical element increases accordingly.

Therefore, in an optical pickup device including such a plastic optical element and using a blue-violet laser as a light source, the optical element is more affected by the further curing of the adhesive when it is irradiated with the light from the light source. Therefore, in this optical pickup device, aberrations, such as astigmatism and coma, in the optical element occur as the use of the optical device increases, resulting in a difficulty in maintaining the quality of the optical device for a long period of time.

Figure 7:
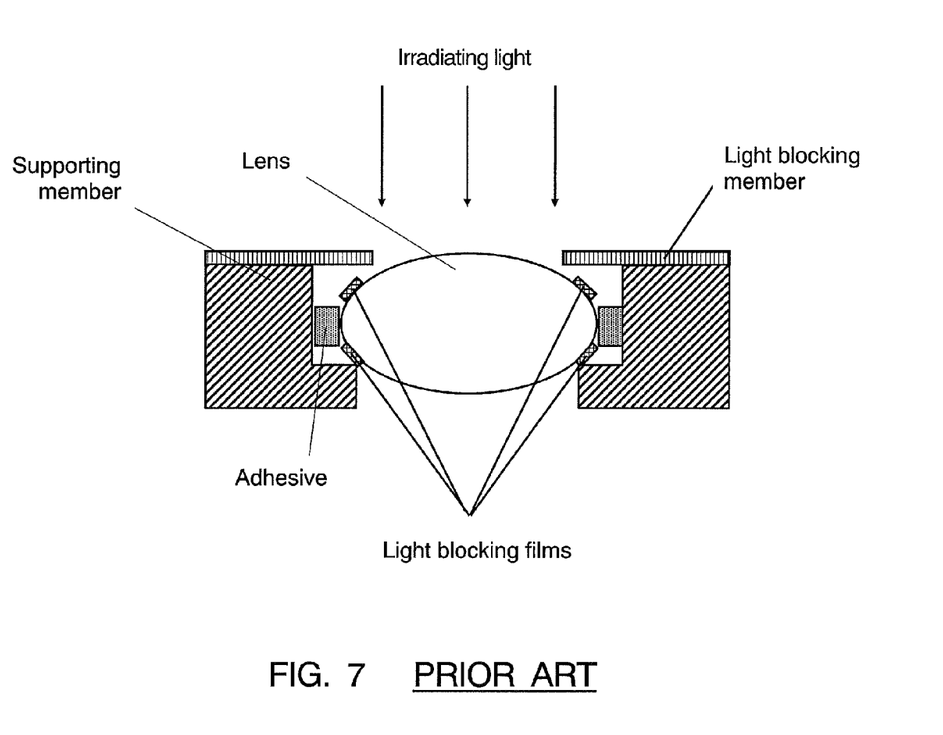
FIG. 7 is a diagram illustrating a conventional optical device.

On the other hand, as an optical device in which an adhesive is not irradiated with light emitted from a light source, JP 2009-10232 A discloses an optical device for an exposure apparatus including an optical element, and a supporting member for supporting the optical element through an adhesive. In this optical device, a light blocking film is formed on the surface of the optical element. FIG. 7 shows the specific configuration of this optical device.

In FIG. 7, a lens is fixed to a supporting member through an adhesive, light blocking films are provided in the vicinity of the bonding portion of the lens, and moreover, a light blocking member is provided on the light irradiation side of the supporting member so as to cover the adhesive. JP 2009-10232 A describes that as the light blocking films, a resin containing a pigment or a material containing Ni or Si can be used, and a material having both a transmittance and a reflectance of 0.1% or less can be used.

SUMMARY OF THE INVENTION

If the configuration of an optical device for an exposure apparatus, including light blocking films and a light blocking member as disclosed in JP 2009-10232 A, is adopted in an optical pickup device, the adverse effects of the above-mentioned further curing of the adhesive on the optical element presumably can be alleviated. It is not easy, however, to produce the optical device configured as disclosed in JP 2009-10232 A, which causes a problem of low productivity.

Accordingly, it is an object of the present invention to provide an optical pickup device including a light source, an optical element, and a supporting member for supporting the optical element through an adhesive, and configured to prevent entry of light into the adhesive and to be produced easily.

The present invention that has achieved the above object is an optical pickup device including:

a light source for emitting light in a first wavelength range including a wavelength of 405 nm;

an optical element for transmitting the light emitted from the light source and guiding the emitted light to an optical disc, and for transmitting light reflected from the optical disc and guiding the reflected light to a detector unit;

a supporting member for supporting the optical element through an adhesive;

a first light blocking member for blocking the light emitted from the light source from entering the adhesive when the optical element guides the emitted light to the optical disc; and a second light blocking member for blocking the light reflected from the optical disc from entering the adhesive when the optical element guides the reflected light to the detector unit, wherein at least one of the first and second light blocking member blocks the light in the first wavelength range and transmits light in a second wavelength range included in an ultraviolet wavelength range of 10 to 400 nm.

According to the present invention, the adhesive is prevented from being irradiated with the light emitted from the light source and the light reflected from the optical disc, and the occurrence of aberrations in the optical element caused by the further curing of the adhesive can be reduced. Furthermore, in the optical pickup device of the present invention, the UV irradiation can be performed to cure the adhesive after the light blocking members are formed. Therefore, this optical pickup device can be produced easily.

DETAILED DESCRIPTION OF THE INVENTION

First Embodiment

Hereinafter, a first embodiment of the present invention will be described with reference to the drawings.

<Description of Configuration Example of Optical Pickup (FIG. 1)>

The configuration of an optical pickup 100 is described with reference to FIG. 1. The optical pickup 100 can be used for a personal computer, an optical disc player, an optical disc recorder, a game machine using an optical disc, etc.

Figure 1:
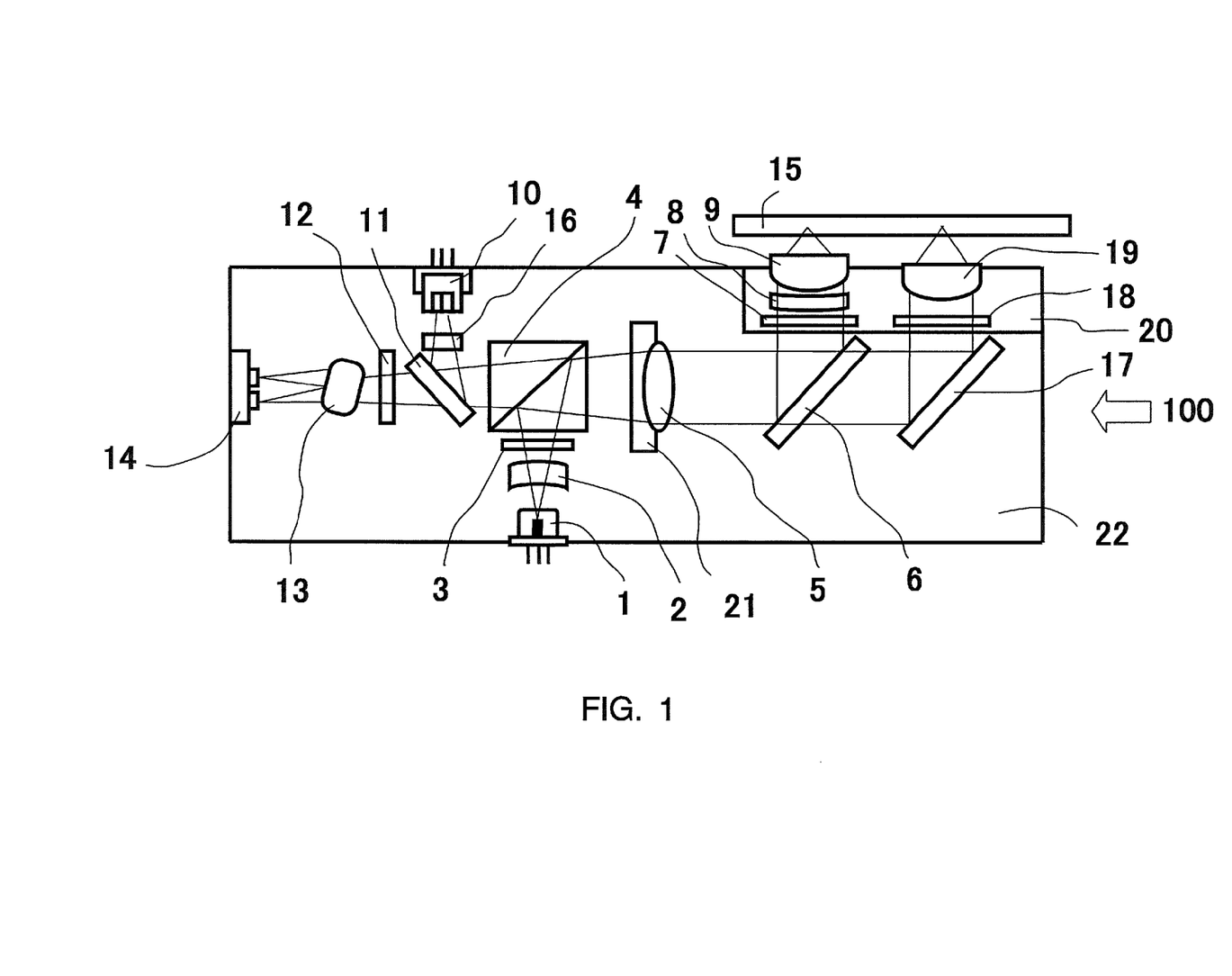
FIG. 1 is a diagram showing a configuration example of an optical pickup device according to an embodiment of the present invention.

FIG. 1 is a diagram showing the configuration of the optical pickup 100. The optical pickup 100 includes a lens holder 20, a collimating lens holder 21, and a base 22 on which the lens holder 20 and the collimating lens holder 21 are provided. On the lens holder 20, a λ/4 plate 7 for blue-violet light, a diffraction lens 8, an objective lens 9 for blue-violet light, a λ/4 plate 18 for red/infrared light, and an objective lens 19 for red/infrared light are provided. On the collimating lens holder 21, a collimating lens 5 is provided. On the base 22, a blue-violet laser 1, a relay lens 2, a λ/2 plate 3 for blue-violet light, a beam splitter 4, a flip-up mirror 6 for blue-violet light, a red/infrared laser 10, a plate beam splitter 11, a first diffraction element 12, a detection lens 13, a detector unit 14, a second diffraction element 16, and a flip-up mirror 17 for red/infrared light are provided. In FIG. 1, an optical disc 15 is mounted on a disc tray not shown, and is not a component of the optical pickup 100.

The blue-violet laser 1 is a light source for BDs, and is configured to emit light with a center wavelength of 405 nm.

The relay lens 2, the collimating lens 5, the diffraction lens 8, and the objective lens 19 for red/infrared light are made of plastic. As stated herein, the term "plastic" means a synthetic resin, and such synthetic resins include not only thermoplastic resins but also thermosetting resins. The relay lens 2, the collimating lens 5, the diffraction lens 8, and the objective lens 19 for red/infrared light can be made of a cycloolefin polymer, for example. The cycloolefin polymer is a material formed from cyclopentadiene as a base material. The relay lens 2, the collimating lens 5, the diffraction lens 8, and the objective lens 19 for red/infrared light are examples of the optical element. In the present embodiment, the cycloolefin polymer is a material having a modulus of elasticity in bending of about 3.1E+9 Pa. This information is described here based on the product information of "ZEONEX (registered trademark) 330R" published by Nippon Zeon Corporation.

The objective lens 9 for blue-violet light and the detection lens 13 are made of glass. The λ/2 plate 3 for blue-violet light, the flip-up mirror 6 for blue-violet light, the λ/4 plate 7 for blue-violet light, the plate beam splitter 11, the first diffraction element 12, the second diffraction element 16, the flip-up mirror 17 for red/infrared light, and the λ/4 plate 18 for red/infrared light are made of glass as a main component. The beam splitter 4 is made of crystal quartz. Glass and crystal quartz are materials having higher moduli of elasticity than plastic. The materials of the λ/2 plate 3 for blue-violet light, the beam splitter 4, the flip-up mirror 6 for blue-violet light, the λ/4 plate 7 for blue-violet light, the objective lens 9 for blue-violet light, the plate beam splitter 11, the first diffraction element 12, the detection lens 13, the second diffraction element 16, the flip-up mirror 17 for red/infrared light, and the λ/4 plate 18 for red/infrared light are not limited to the above-mentioned materials. The λ/2 plate 3 for blue-violet light, the beam splitter 4, the flip-up mirror 6 for blue-violet light, the λ/4 plate 7 for blue-violet light, the objective lens 9 for blue-violet light, the plate beam splitter 11, the first diffraction element 12, the detection lens 13, the second diffraction element 16, the flip-up mirror 17 for red/infrared light, and the λ/4 plate 18 for red/infrared light are examples of the optical element.

The lens holder 20, the collimating lens holder 21, and the base 22 are examples of the supporting member.

<Description of Bonding Structure of Optical Element (FIG. 2)>

Figure 2:
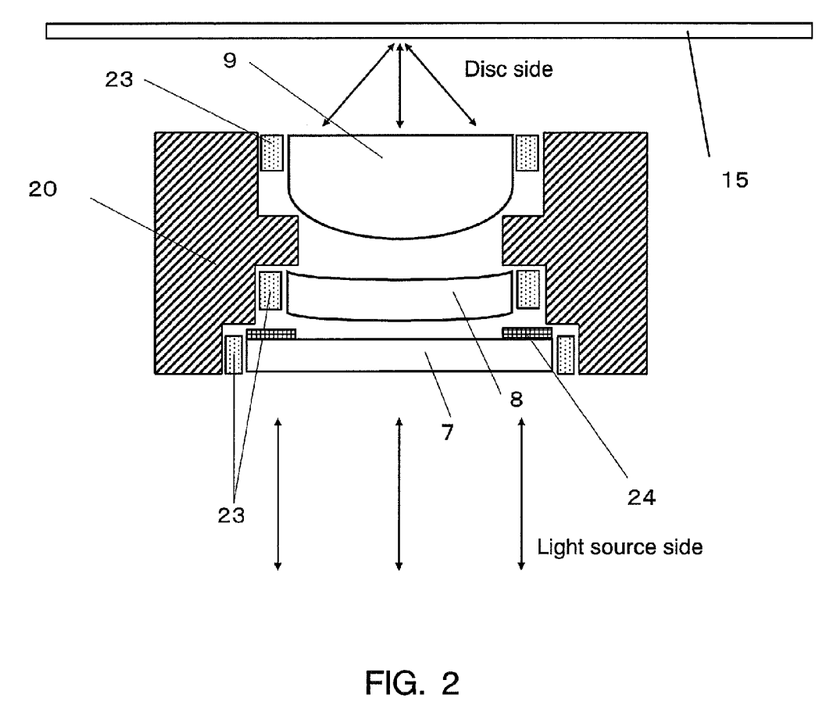
FIG. 2 is a partially enlarged view of a bonding structure according to a first embodiment of the present invention.

The bonding structure of the optical element in the present embodiment is described with reference to FIG. 2. The optical pickup 100 has the diffraction lens 8, as a plastic optical element, on the path of the emitted light guided from the blue-violet laser 1 to the optical disc 15 and on the path of the reflected light guided from the optical disc 15 to the detector unit 14. The diffraction lens 8 is bonded and fixed to the lens holder 20, as a supporting member, with an adhesive 23. As the adhesive 23, for example, a material composed of 25 to 35% of an acrylate oligomer, 55 to 65% of an acrylate monomer, less than 0.5% of toluene, and less than 10% of a photopolymerization initiator can be used.

The lens holder 20 is provided with the objective lens 9 for blue-violet light on the optical disc side and with the λ/4 plate 7 for blue-violet light on the light source side. The λ/4 plate 7 for blue-violet light is bonded and fixed to the lens holder 20 with the adhesive 23 at a position farther from the center of the light beam than a position where the diffraction lens 8 is bonded and fixed. That is, the λ/4 plate 7 for blue-violet light is an element having outer dimension larger than the effective diameter of the light beam passing through the diffraction lens 8. So, a light blocking film 24 as a first light blocking member is formed on the area outside the effective area of the light beam passing through the λ/4 plate 7 for blue-violet light.

For the light blocking member 24, a material that blocks light in the first wavelength range including a wavelength of 405 nm and transmits light in the second wavelength range included in an ultraviolet wavelength range of 10 to 400 nm is used. Since the adhesive usually is cured by ultraviolet light with a center wavelength of 365 nm, the second wavelength range preferably includes a wavelength of 365 nm. Preferably, the first wavelength range and the second wavelength range do not overlap each other. More preferably, the first wavelength range falls in the range from 398 nm to 420 nm, and the second wavelength range falls in the range from 350 nm to 380 nm.

Figure 5:
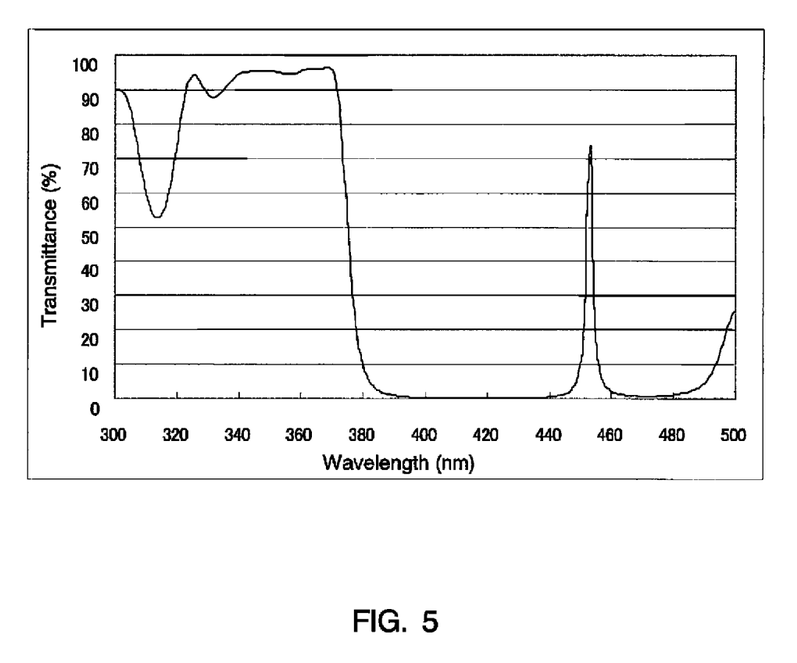
FIG. 5 is a graph showing the light transmittance of an example of a light blocking film used in the first embodiment.

In the present embodiment, as the above-mentioned material, a dielectric multilayer film is used for the light blocking film 24. The dielectric multilayer film can be formed of, for example, a high refractive index layer made of $HfO_2$, $Al_2O_3$, $TiO_2$, $Ta_2O_5$, $Nb_2O_2$, $ZrO_2$, etc., and a low refractive index layer made of $SiO_2$, etc. The specific structure (including the material, the thicknesses of respective layers, and the number of layers) of the dielectric multilayer film that blocks the light in the first wavelength range including the wavelength of 405 nm and transmits the light in the second wavelength range included in the ultraviolet wavelength range of 10 to 400 nm can be obtained based on the calculation by the matrix method. The calculation by the matrix method can be performed using commercially available software. Table 1 below shows an example of the specific structure of the dielectric multilayer film. FIG. 5 shows the light transmittance of the dielectric multilayer film structured as shown in Table 1.

TABLE 1

| Layer | Material | Thickness (nm) |
| --- | --- | --- |
| 1 | $SiO_2$ | 44.44 |
| 2 | $HfO_2$ | 59.25 |
| 3 | $SiO_2$ | 79.3 |
| 4 | $HfO_2$ | 55.47 |
| 5 | $SiO_2$ | 73.08 |
| 6 | $HfO_2$ | 48.62 |
| 7 | $SiO_2$ | 70.99 |
| 8 | $HfO_2$ | 48.76 |
| 9 | $SiO_2$ | 72.69 |
| 10 | $HfO_2$ | 51.42 |
| 11 | $SiO_2$ | 74.58 |
| 12 | $HfO_2$ | 50.38 |
| 13 | $SiO_2$ | 70.7 |
| 14 | $HfO_2$ | 45.07 |
| 15 | $SiO_2$ | 78.3 |
| 16 | $HfO_2$ | 135.42 |
| 17 | $SiO_2$ | 73.94 |
| 18 | $HfO_2$ | 44.03 |
| 19 | $SiO_2$ | 72.2 |
| 20 | $HfO_2$ | 51.86 |
| 21 | $SiO_2$ | 81.63 |
| 22 | $HfO_2$ | 50.46 |
| 23 | $SiO_2$ | 71.2 |
| 24 | $HfO_2$ | 42.09 |
| 25 | $SiO_2$ | 86.75 |
| 26 | $HfO_2$ | 58.88 |
| 27 | $SiO_2$ | 89.6 |
| 28 | $HfO_2$ | 60.26 |
| 29 | $SiO_2$ | 93.05 |
| 30 | $HfO_2$ | 59.54 |
| 31 | $SiO_2$ | 79.72 |

TABLE 1-continued

| Layer | Material | Thickness (nm) |
| --- | --- | --- |
| 32 | $HfO_2$ | 46.47 |
| 33 | $SiO_2$ | 51.11 |

The lens holder 20 has, in its opening, a narrowed portion above the diffraction lens 8, and this narrowed portion forms the second light blocking member.

<Effects of Bonding Structure of Optical Element (FIG. 2)>

The relationship among the optical element, the supporting member, and the light blocking members is described below. The diffraction lens 8 is bonded and fixed to the lens holder 20 with the adhesive 23. The light beam from the blue-violet laser 1 travels from the light source along the path shown in FIG. 2 and passes through the λ/4 plate 7 for blue-violet light. Thereafter, the light beam passes through the diffraction lens 8 fixed to the lens holder 20, and then is reflected at the optical disc 15. The light beam thus reflected passes through the diffraction lens 8 and is guided to the detector unit 14 through the optical system. In this case, part of the light beam from the blue-violet laser 1 may be directed toward the adhesive 23 for bonding the diffraction lens 8, but is blocked by the light blocking film 24 formed on the λ/4 plate 7 for blue-violet light. As a result, the adhesive 23 is not irradiated with the light beam from the blue-violet laser 1. Furthermore, the light beam reflected from the optical disc returns to the diffraction lens 8 only through the opening of the lens holder 20 with its diameter being narrowed by the second light blocking member 23. Therefore, the adhesive 23 is not irradiated with this light beam. Accordingly, the further curing of the adhesive 23 is inhibited, and the changes in the aberration in the optical element can be reduced even when the use of the optical device increases.

In addition, the light blocking film 24 transmits the light in the second wavelength range included in the ultraviolet wavelength range. Therefore, when the adhesive for the diffraction lens 8 and the adhesive for the λ/4 plate 7 for blue-violet light are irradiated with LTV light to be cured for the fixation thereof, both the adhesive for the diffraction lens 8 and the adhesive for the λ/4 plate 7 for blue-violet light can be cured simultaneously by a single LTV irradiation. This is an advantage in that the structure having the light blocking members can be produced easily with reduced process steps.

Second Embodiment

Hereinafter, a second embodiment of the present invention will be described with reference to the drawing. Since the configuration of the optical pickup 100 is almost the same as that of the first embodiment, only the differences in the bonding structure of the optical element are described below.

<Description of Bonding Structure of Optical Element (FIG. 3)>

Figure 3:
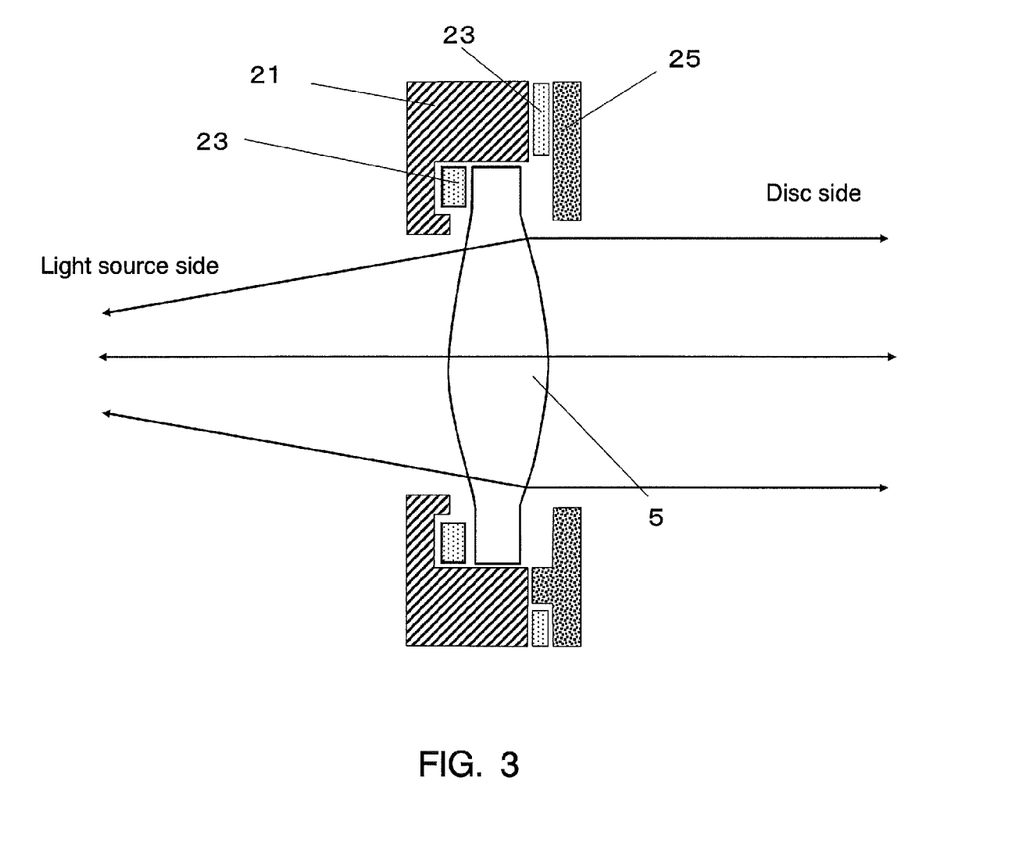
FIG. 3 is a partially enlarged view of a bonding structure according to a second embodiment of the present invention.

The bonding structure of the optical element in the present embodiment is described with reference to FIG. 3. The optical pickup 100 has the collimating lens 5, as a plastic optical element, on the path of the emitted light guided from the blue-violet laser 1 to the optical disc 15 and on the path of the reflected light guided from the optical disc 15 to the detector unit 14. The collimating lens 5 is bonded and fixed to the collimating lens holder 21, as a supporting member, with the adhesive 23. A projecting portion is formed on the collimating lens holder 21 so that the diameter of the opening of the collimating lens holder 21 is reduced on the light source side of the collimating lens 5, and this projecting portion forms the first light blocking member. Furthermore, the edge portion of the collimating lens 5 is fixed on the projecting portion (first light blocking member) with the adhesive 23. In this case, the light beam traveling from the collimating lens 5 toward the optical disc has a larger effective diameter (lower luminous flux density) than that traveling from the light source toward the collimating lens 5. Therefore, it is more advantageous to form the light blocking member as the projecting part of the supporting member on the light source side where the light beam has a smaller effective diameter (higher luminous flux density) because the projecting part of the supporting member (light blocking member) can be formed closer to the center of the light beam to obtain a higher light blocking effect, and the collimating lens 5 can be fixed to the collimating lens holder 21 more stably. Accordingly, from the viewpoints of the light blocking effect and the stable fixation of the optical element, in a preferred embodiment, part of the supporting member forms one of the first and second light blocking members that is located on the higher luminous flux density side. It is preferable in this preferred embodiment that the optical element be fixed to this light blocking member with the adhesive.

Furthermore, on the disc side of the collimating lens 5, a light blocking plate 25 as a second light blocking member is fixed to the collimating lens holder 21 with the adhesive 23.

As in the first embodiment, a material that blocks the light in the first wavelength range including the wavelength of 405 nm and transmits the light in the second wavelength range included in the ultraviolet wavelength range of 10 to 400 nm is used for the light blocking plate 25. In the present embodiment, a band pass filter is used as the light blocking plate 25. As the band pass filter, for example, a color glass filter (such as an ultraviolet transmitting, visible light absorbing filter, trade name "UG1" manufactured by Schott) can be used.

<Effects of Bonding Structure of Optical Element (FIG. 3)>

The relationship among the optical element, the supporting member, and the light blocking members is described below. The collimating lens 5 is bonded and fixed to the collimating lens holder 21 with the adhesive 23. The light beam from the blue-violet laser 1 travels along the path shown in FIG. 3 and passes through the collimating lens 5. Part of the light beam from the blue-violet laser 1 may be directed toward the adhesive 23 for bonding the collimating lens 5, but the collimating lens holder 21 is provided with the first light blocking member, which prevents the adhesive 23 from being irradiated with the light beam.

The light beam that has passed through the collimating lens 5 is reflected at the optical disc, and the reflected light beam is guided to the detector unit 14 through the optical system. In this case, not only part of the light reflected from the signal layer of the optical disc but also part of the light reflected from the surface of the optical disc or from the other layer of the optical disc, as reflected stray light, return to the collimating lens 5. This reflected stray light returns also to the area outside the effective diameter of the returning path to the collimating lens 5, and therefore part of the reflected light beam also is directed toward the adhesive 23 for bonding the collimating lens 5. However, the light blocking plate 25 fixed to the collimating lens holder 21 blocks this light beam and the adhesive 23 is not irradiated with the reflected light beam. As a result, the further curing of the adhesive 23 is inhibited, and the changes in the aberration in the optical element can be reduced even when the use of the optical device increases.

In addition, in the present embodiment, a light blocking member that transmits the light in the second wavelength range included in the ultraviolet wavelength range is provided. Therefore, when the adhesive for the collimating lens 5 and the adhesive for the light blocking plate 25 are irradiated with UV light to be cured for the fixation thereof, both the adhesive for the collimating lens 5 and the adhesive for the light blocking plate 25 can be cured simultaneously by a single UV irradiation. This is an advantage in that the structure having the light blocking members can be produced easily with reduced process steps.

Third Embodiment

Hereinafter, a third embodiment of the present invention will be described with reference to the drawing. Since the configuration of the optical pickup 100 is almost the same as that of the first embodiment, only the differences in the bonding structure of the optical element are described below.

<Description of Bonding Structure of Optical Element (FIG. 4)>

Figure 4:
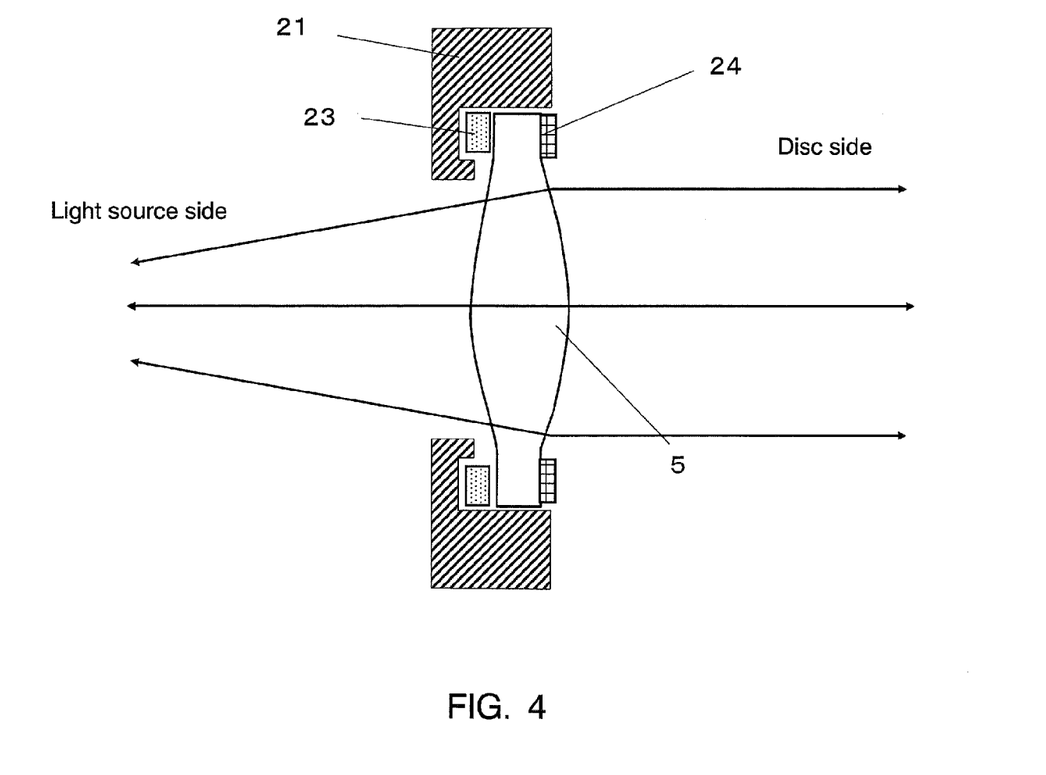
FIG. 4 is a partially enlarged view of a bonding structure according to a third embodiment of the present invention.

The bonding structure of the optical element in the present embodiment is described with reference to FIG. 4. The optical pickup 100 has the collimating lens 5, as a plastic optical element, on the path of the emitted light guided from the blue-violet laser 1 to the optical disc 15 and on the path of the reflected light guided from the optical disc 15 to the detector unit 14. The collimating lens 5 is bonded and fixed to the collimating lens holder 21, as a supporting member, with the adhesive 23. As in the second embodiment, a projecting portion is formed on the collimating lens holder 21 so that the diameter of the opening of the collimating lens holder 21 is reduced on the light source side of the collimating lens 5, and this projecting portion forms the first light blocking member. Furthermore, the edge portion of the collimating lens 5 is fixed on the projecting portion (first light blocking member) with the adhesive 23.

A light blocking film 24 is provided on the disc-side surface of the collimating lens 5. As in the first embodiment, a material that blocks the light in the first wavelength range including the wavelength of 405 nm and transmits the light in the second wavelength range included in the ultraviolet wavelength range of 10 to 400 nm is used for this light blocking film 24. More specifically, a dielectric multilayer film like the light blocking film 24 of the first embodiment is used.

An anti-reflection film (not shown) is provided on the surface of the collimating lens. The anti-reflection film also can be formed of a dielectric multilayer film. The dielectric multilayer film as an anti-reflection film can be formed of, for example, a high refractive index layer made of $HfO_2$, $Al_2O_3$, $TiO_2$, $Ta_2O_5$, $Nb_2O_2$, $ZrO_2$, etc., and a low refractive index layer made of $SiO_2$, etc. The specific structure of the dielectric multilayer film is known, and can be designed based on the calculation by the matrix method also.

Accordingly, when the dielectric multilayer film is formed on a surface of the optical element, a conventional anti-reflection film formation process can be applied to form the dielectric multilayer film. This is advantageous in terms of production. Furthermore, when the optical element has an anti-reflection film formed on its surface, a dielectric multilayer film as a light blocking member is formed on the anti-reflection film, and the dielectric multilayer film and the anti-reflection film are made of the same material, it is more advantageous in terms of production.

<Effects of Bonding Structure of Optical Element (FIG. 4)>

The relationship among the optical element, the supporting member, and the light blocking members is described below. The collimating lens 5 is bonded and fixed to the collimating lens holder 21 with the adhesive 23. The light beam from the blue-violet laser 1 travels along the path shown in FIG. 4 and passes through the collimating lens 5. Part of the light beam from the blue-violet laser 1 may be directed toward the adhesive 23 for bonding the collimating lens 5, but the collimating lens holder 21 is provided with the first light blocking member, which prevents the adhesive 23 from being irradiated with the light beam.

The light beam that has passed through the collimating lens 5 is reflected at the optical disc, and the reflected light beam is guided to the detector unit 14 through the optical system. In this case, not only part of the light reflected from the signal layer of the optical disc but also part of the light reflected from the surface of the optical disc or from the other layer of the optical disc, as reflected stray light, return to the collimating lens 5. This reflected stray light returns also to the area outside the effective diameter of the returning path to the collimating lens 5, and therefore part of the reflected light beam also is directed toward the adhesive 23 for bonding the collimating lens 5. However, the light blocking film 24 formed on the area, on the surface of the collimating lens 5, outside the effective diameter of the returning path to the collimating lens 5 blocks this light beam and the adhesive 23 is not irradiated with the reflected light beam. As a result, the further curing of the adhesive 23 is inhibited, and the changes in the aberration in the optical element can be reduced even when the use of the optical device increases.

In addition, in the present embodiment, as in the first embodiment, a light blocking film made of a material that blocks the light in the first wavelength range including the wavelength of 405 nm and transmits the light in the second wavelength range (for example, wavelengths of 365 nm±5) included in the ultraviolet wavelength range of 10 to 400 nm is provided. Therefore, the collimating lens 5 can be bonded and fixed to the collimating lens holder 21 after the light blocking film 24 is formed on the collimating lens 5. That is, in the present embodiment, the collimating lens 5 can be bonded and fixed to the collimating lens holder 21 in the following manner. First, the light blocking film 24 is formed on the collimating lens 5. Next, the collimating lens 5 is bonded and fixed to the collimating lens holder 21 with an adhesive. At this stage, the adhesive is not yet cured. Then, the adhesive is irradiated with UV light (with, for example, 365 nm±5) through the light blocking film 24 and the collimating lens 5. Since the light blocking film 24 transmits the UV light, it does not interfere with the UV curing of the adhesive. This process has an advantage of being able to bond and fix a large number of collimating lenses 5 collectively in the production. In addition, since the light blocking film 24 does not interfere with the UV curing of the adhesive, the workability during production can be improved.

Other Embodiments

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

For example, in the above-described embodiments, a material that blocks the light in the first wavelength range including the wavelength of 405 nm and transmits the light in the second wavelength range included in the ultraviolet wavelength range of 10 to 400 nm is used for only one of the first and second light blocking members. This material may be used for both the first and second light blocking members. For example, a peripheral portion of the optical element may be fixed to the supporting member with an adhesive and light blocking films made of this material are provided on both sides of the optical element in the vicinity of the peripheral portion.

In the above-described embodiments, a dielectric multilayer film or a band pass filter is used as this material, but this material is not limited to these film and filter.

Furthermore, in other embodiments, the adhesive described above can be replaced with another adhesive, for example, an adhesive composed of 65 to 75% of an acrylate monomer, 20 to 30% of an elastomer, and less than 10% of a photopolymerization initiator.

INDUSTRIAL APPLICABILITY

The present invention is applicable to apparatuses including optical pickups, such as reproducing apparatuses (players), recording apparatuses (recorders), and personal computers. The present invention also is applicable to bar code readers and the like including light sources and detector units.

What is claimed is:

1. An optical pickup device comprising:
   a light source for emitting light in a first wavelength range;
   an optical element for transmitting the light emitted from the light source and guiding the emitted light to an optical disc, and for transmitting light reflected from the optical disc and guiding the reflected light to a detector unit;
   a supporting member for supporting the optical element through an adhesive; a first light blocking member for blocking the light emitted from the light source from entering the adhesive when the optical element guides the emitted light to the optical disc; and
   a second light blocking member for blocking the light reflected from the optical disc from entering the adhesive when the optical element guides the reflected light to the detector unit,
   wherein at least one of the first light blocking member and the second light blocking member is made of a material that blocks the light in the first wavelength range and transmits light in a second wavelength range, wherein the first wavelength range falls in the range from 398 nm to 420 nm, and the second wavelength range falls in the range from 350 nm to 380 nm.

2. The optical pickup device according to claim 1, wherein the second wavelength range includes a wavelength of 365 nm.

3. The optical pickup device according to claim 1, wherein at least one of the first and second light blocking members is a dielectric multilayer film.

4. The optical pickup device according to claim 3, wherein the dielectric multilayer film is formed on a surface of the optical element.

5. The optical pickup device according to claim 4, wherein the optical element has an anti-reflection film formed on its surface, the dielectric multilayer film is formed on the anti-reflection film, and the dielectric multilayer film and the anti-reflection film are made of the same material.

6. The optical pickup device according to claim 1, wherein part of the supporting member forms one of the first and second light blocking members that is located on a higher luminous flux density side.

7. The optical pickup device according to claim 1, wherein the optical element is made of plastic.

* * * * *